United States Patent [19]
Printz

[11] Patent Number: 6,003,473
[45] Date of Patent: Dec. 21, 1999

[54] PET IDENTIFICATION AND RETRIEVAL DEVICE

[76] Inventor: Robert L. Printz, 13142 Riverside Dr., Apt. #4, Sherman Oaks, Calif. 91423

[21] Appl. No.: 09/022,600

[22] Filed: Feb. 12, 1998

[51] Int. Cl.⁶ .................................................... A01K 15/02
[52] U.S. Cl. ........................... 119/859; 119/719; 340/573
[58] Field of Search ................... 119/859, 858, 119/712, 719; 29/896.2; 340/539, 573; 224/240

[56] References Cited

U.S. PATENT DOCUMENTS

| | | | |
|---|---|---|---|
| D. 323,744 | 2/1992 | Casale | 224/240 X |
| 3,430,256 | 2/1969 | Goodman | 346/107 |
| 3,585,743 | 6/1971 | Jeffers | 40/21 |
| 4,091,766 | 5/1978 | Colliard | 119/106 |
| 4,137,660 | 2/1979 | Dettmann et al. | 40/303 |
| 4,584,967 | 4/1986 | Taplin | 119/109 |
| 4,598,272 | 7/1986 | Cox | 340/539 |
| 4,772,873 | 9/1988 | Duncan | 341/110 |
| 4,815,032 | 3/1989 | Fujii | 364/900 |
| 5,092,018 | 3/1992 | Seron | 119/858 X |
| 5,217,379 | 6/1993 | Kirschenbaum et al. | 434/236 |
| 5,233,942 | 10/1993 | Cooper et al. | 119/792 |
| 5,337,041 | 8/1994 | Friedman | 340/573 |
| 5,355,839 | 10/1994 | Mistry | 119/858 |
| 5,474,033 | 12/1995 | Mitchell, Jr. | 119/860 |
| 5,515,033 | 5/1996 | Matarazzo | 119/859 X |
| 5,718,192 | 2/1998 | Sebastian | 119/795 |

*Primary Examiner*—Peter M. Poon
*Assistant Examiner*—Yvonne R. Abbott
*Attorney, Agent, or Firm*—John D. Gugliotta

[57] ABSTRACT

A pet identification and retrieval device is disclosed, designed to provide information regarding lost pets to individuals who find the pet, and is of compact design, consisting of a front half enclosure and rear half enclosure. The front half enclosure contains a play switch, a speaker opening and a low battery indicator. The rear half enclosure contains a recessed recording switch, a permanent identification plate, and an easy to open and close fastening means. The device is connected to a pet's collar via a swivel link or is held stationary against the collar by other fastening means. A message is recorded using solid state digital recording and playback technology, which permits a 30-second message to be recorded.

6 Claims, 6 Drawing Sheets

PET IDENTIFICATION AND RETRIEVAL DEVICE

BACKGROUND OF THE INVENTION

1. Field of the Invention

The present invention relates generally to animal retrieval devices, and, more particularly, to a pet identification and retrieval device.

2. Description of the Related Art

Pets are a beloved part of many family homes. The warmth, company and affection which they provide is well known. After all, it is said that dogs are man's best friends.

Sometimes, however, that relationship between human and animal is threatened by the disappearance of the animal from the home. This can happen in a number of ways. The animal may be an outside animal, such as a dog or cat, which strays from home and gets lost. Such animals often end up at animal shelters or dog pounds. If the family has moved into a new neighborhood, it is likely that the family pet could get lost in its new surroundings.

Even for indoor pets, there is a chance of the animal being lost, since many animals like to sneak out of a partially open door. Even with attentive and caring owners, the possibility of a lost pet exists.

In this event, it becomes paramount that individuals who find the animal have a simple and effective means to identify the animal and contact its owner.

The previous art includes numerous dog tags. Examples of this type of device include U.S. Pat. No. 4,137,660, issued in the name of Dettmann et al., U.S. Pat. No. 4,091,766, issued in the name of Colliard, and U.S. Pat. No. 3,585,743, issued in the name of Jeffers. These dog tags usually include metal tags engraved with information regarding the animal, or an identification card with written information stored in a plastic sheet located on the collar.

These devices suffer from one or more of the following problems. First, dog tags provide limited space for information on the animal, such as what the animal likes to eat. This is important if the animal must spend the night at the individual's home who found the animal. Second, when the family moves or goes on vacation, the tag must be replaced with a new tag that contains the new address and phone number. Third, the metal tags have a tendency to rust over time. Fourth, the engraved information on the metal tags has a tendency to wear down and become unreadable. Fifth, the tag does little to facilitate calming the animal, other than providing the animal's name so that the individuals who found him or her can use the correct name. Sixth, the paper tags are affected by moisture in the air, such as when the animal is outside in the rain. Such moisture can make the written information unreadable.

U.S. Pat. No. 5,355,839, issued in the name of Mistry, discloses a retrieval device that incorporates a micro cassette recorder into a collar. The problem with the '839 device is that the microcassette can get damaged in the rain or if the dog comes near a magnetic source. Also, the '839 device requires that the individual finding the animal have a micro cassette player to listen to the message and discover the animal's name and its owner's identification. This severely limits the effectiveness of the device.

Digital recorders exist in the previous art. Examples include U.S. Pat. No. 4,815,032, issued in the name of Fujii, U.S. Pat. No. 4,772,873, issued in the name of Duncan, and U.S. Pat. No. 3,430,256, issued in the name of Goodman. In general, such devices are bulky and too large to be used with a dog or cat collar. Such digital technology must be miniaturized so as to fit on a dog or cat's collar.

One device, being sold on the market, incorporates solid-state technology to digitally record a message to be replayed by the individual finding the animal. There are several problems with such a device, however. First, the device is bulky, heavy and cumbersome, making it effective only with bigger animals, such as large dogs. Cats would find the device bulky and uncomfortable. Second, the device is an elongated, hanging from the animal's collar. This swinging motion would be distracting to pets. Also, the swinging motion would increase the chance of the device getting caught on some object and choking the animal. Third, the attachment point for the device to the collar is extremely weak, increasing the risk that the device would inadvertently break free while being worn. Fourth, the device requires that the back plate be removed to record a message. This is difficult for many individuals, such as the young, the elderly and the infirm. Also, whenever the family moves, or takes the pet on vacation, the device must be opened to record a new message. This is a difficult problem given most families do not have the minuscule screw drivers necessary to open the back plate. Fifth, there is no way for the owner to know if the battery is operational, unless the owner opens up the device and tests the battery with electrical equipment.

A search of the prior art did not disclose any patents that read directly on the claims of the instant invention. Consequently, a need has been felt for providing an apparatus and method which overcomes the problems cited above.

SUMMARY OF THE INVENTION

It is therefore an object of the present invention to provide an improved pet identification and retrieval device that is streamline, lightweight, which permits recording without disassembling the device, which does not require the use of a small screwdriver and screws to open and close the device, with a battery indicator light and an attached engravable metal tag, making it effective with all owner and all types and sizes of pets.

It is another object of the present invention to provide a self-contained device that plays a recorded message to an individual who finds a lost pet. This information can include the pet's name, owner's address and name and phone number, and any other information the owner feels is important.

It is another object of the present invention to provide for a device that permits the animal to hear its owner's voice during this stressful time, which helps calm the animal, and reduce the stress levels of the animal.

Briefly described according to one embodiment of the present invention, a pet identification and retrieval device is disclosed, designed to provide information regarding lost pets to individuals who find the pet, and is of compact design, consisting of a front half enclosure and rear half enclosure. The front half enclosure contains a play switch, a speaker opening and a low battery indicator. The rear half enclosure contains a recessed recording switch, a permanent identification plate, and an easy to open and close fastening means. The device is connected to a pet's collar via a swivel link or is held stationary against the collar by other fastening means. A message is recorded using solid state digital recording and playback technology, which permits a 30-second message to be recorded.

It is another object of the present invention to provide a recording device that uses solid state digital technology. This eliminates the need for moving mechanical parts, and also, allows for a miniature recording and playback device that can be worn around the necks of smaller pets, such as cats and ferrets.

It is another object of the present invention to provide a device that is universal in its application, being able to used with pets of all sizes and by owners of differing hand dexterity.

It is another object of the present invention to provide a device that is streamline in design, thereby eliminating swinging problems, such as breakage, disconnection from the collar, or hanging of the pet.

It is another object of the present invention to provide a low battery indicator, which will alert the owner when it is time to change the battery, thereby reducing the chance that the animal will get lost with an identification device that is not operational.

It is another object of the present invention to provide a permanent identification plate, such as an engravable metal tag, secured to the back half of the rear half enclosure. This provides several benefits. First, the engraved information can be used for additional phone numbers, travel or medical information. Second, in case the digital recording device malfunctions, there is still the basic information, such as the pet's name and the owner's permanent address and phone number, available to assist the individual who found the animal in contacting the pet's owner.

It is another object of the present invention to provide a device that is lightweight, thus facilitating use with smaller animals, such as cats, ferrets, and bunnies.

It is another object of the present invention to provide a device that allows for recording a message without opening up the device. This is accomplished by placing a recessed recording switch on the exterior of the device. The switch is activated by pressing down on the switch with a pointed object, thus reducing the risk of accidental erasure of the message.

It is another object of the present invention to provide a device that is easy to open, thus facilitating battery removal.

It is another object of the present invention to provide a device that provides for a long message, of at least 30 seconds in duration, so as to allow the pet to hear the owner's voice, thereby helping to calm the animal. Also, additional information can be stored on the device, such as an update on the animal's shots, such as rabies, in case someone gets bitten by the scared animal.

It is another object of the present invention to provide a device that is waterproof, thus ensuring the device will not cease to function due to moisture in the device.

It is another object of the present invention to provide a device that has no moving parts, thus eliminating the risk of mechanical component failure.

DESCRIPTIVE KEY 10 pet identification and retrieval device
15 pet
20 collar
25 front half enclosure
30 play switch
35 speaker opening
40 low battery indicator
45 instructional description
50 swivel link
55 connection ring
60 rear half enclosure
65 first fastening means
70 permanent identification plate
75 recessed recording switch
80 speaker
85 batteries
90 digital recording and playback circuit
95 power supply circuitry
100 parallel connection
105 positive lead
110 negative lead
115 voltage regulator
120 logic and control circuitry
125 memory circuit
130 analog amplifier and recording circuit
135 analog/digital converter
140 alternate enclosure
145 second fastening means
150 access door
155 third fastening means

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description of a pet identification and retrieval device.

The best mode for carrying out the invention is presented in terms of its preferred embodiment, herein depicted within the Figures.

1. Detailed Description of the Figures

Figure 1:
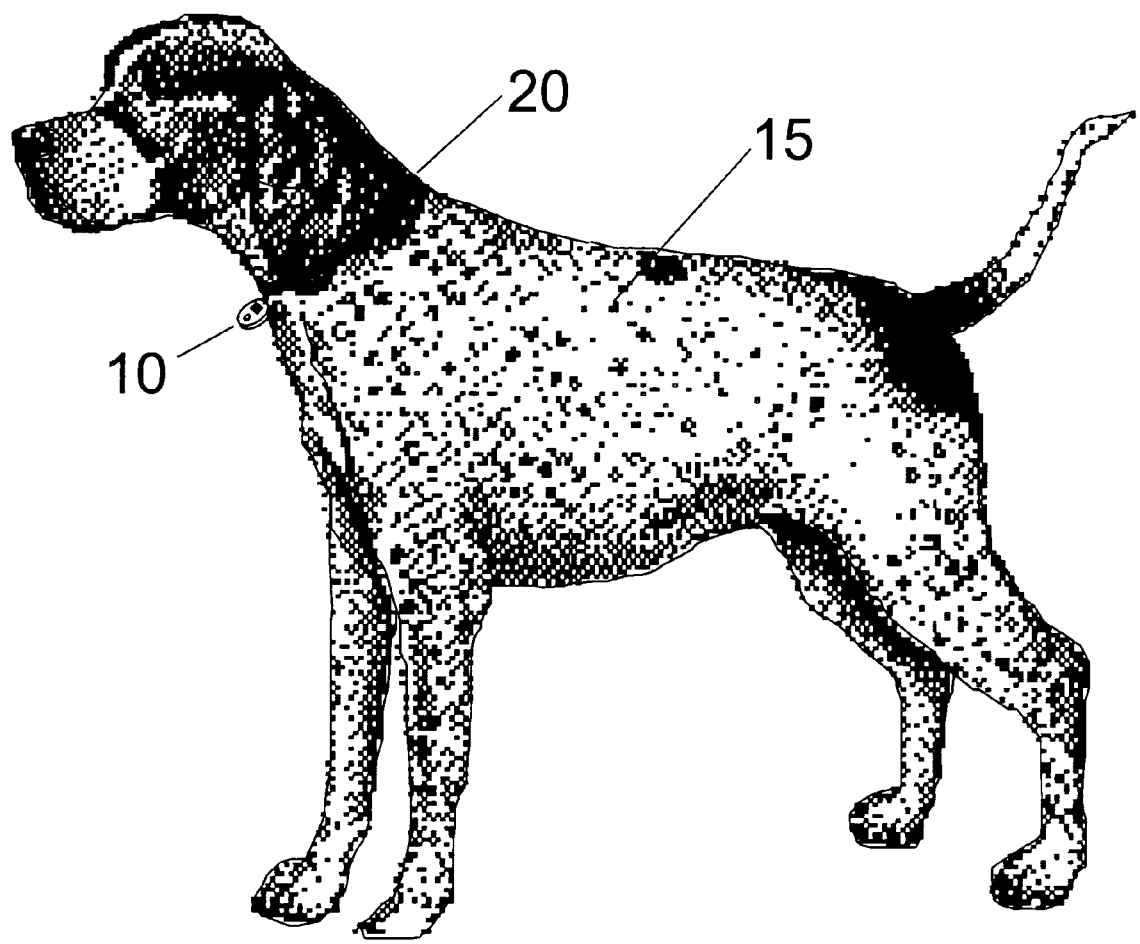
FIG. 1 is a front perspective view of the preferred embodiment of a pet identification and retrieval device 10 shown in a utilized state.

Referring now to FIG. 1, a pet identification and retrieval device 10 is shown, according to the present invention, in a utilized state on a pet 15. While the pet 15 is depicted as a dog, it should be noted that the pet identification and retrieval device 10 is suitable for use on all pets such as cats, rabbits, ferrets and the like. The pet identification and retrieval device 10 is fastened to a collar 20. The method of fastening will be described in greater detail hereinbelow. The pet identification and retrieval device 10 can be worn on the collar 20 with other tags or licenses if necessary, or it may be worn as a sole device. The overall size of the pet identification and retrieval device 10 is similar to that of conventional tags or licenses currently worn by pets.

Figure 2:
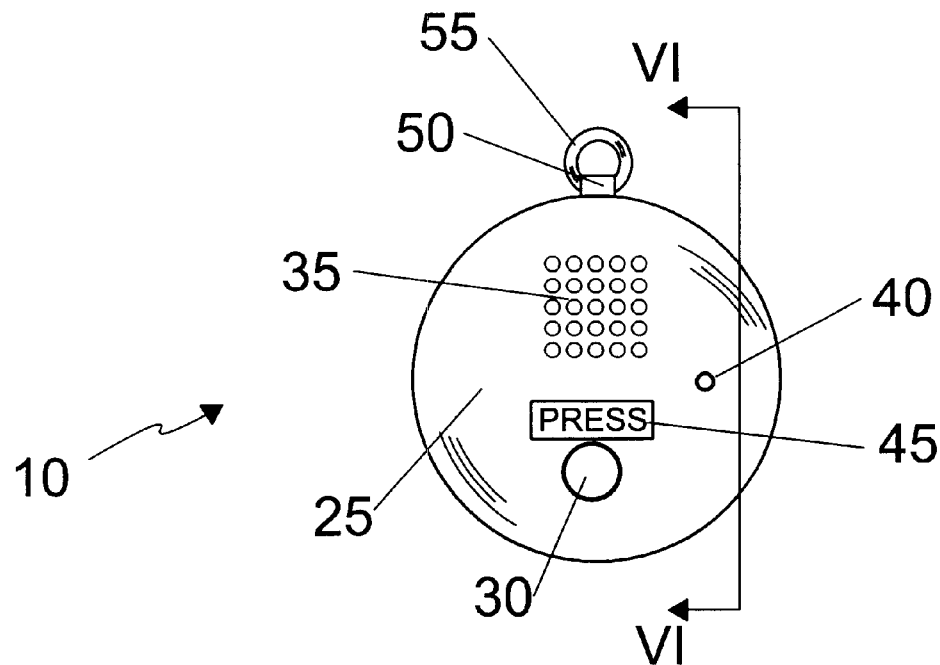
FIG. 2 is a front view thereof.

Referring to FIG. 2, a front view of the pet identification and retrieval device 10 is shown. A front half enclosure 25 is provided which contains a play switch 30, a speaker opening 35 and a low battery indicator 40. It is envisioned that the front half enclosure 25 would be manufactured from plastic in an injection molding process, though it can be seen by those familiar in the art, that other materials and/or methods such as stamping, casting or the like could also be substituted. The play switch 30 is provided for the individual to press who wishes to hear the message. This said individual could be the owner, a friend or a person who finds the lost pet 15 (not shown in this FIG.) The play switch 30 is labeled prominently with an instructional description 45 so as to provide direction to the user. The speaker opening 35 is provided to allow for the passage of sound from within the device in the case of playing back of the recorded message. The speaker opening 35 also allows for the passage of sound into the device during the recording of a message as will be described hereinbelow. The purpose of the low battery indicator 40 is to alert the owner of the pet 15 (not shown in this FIG.) that the internal batteries, as will be described in greater detail hereinbelow, are failing, and should be replaced as soon as possible. It is envisioned that the low battery indicator 40 would be a light emitting diode and would flash on a periodic basis. Located atop the front half enclosure 25 is a swivel link 50 through which a connection ring 55 is positioned. The swivel link 50 allows the pet identification and retrieval device 10 to move through a horizontal plane when worn by the pet 15 (as seen in FIG. 1) The connection ring 55 is of a conventional design, found on conventional pet identification tags and is what allows the pet identification and retrieval device 10 to fasten to the collar 20 (as shown in FIG. 1)

Figure 3:
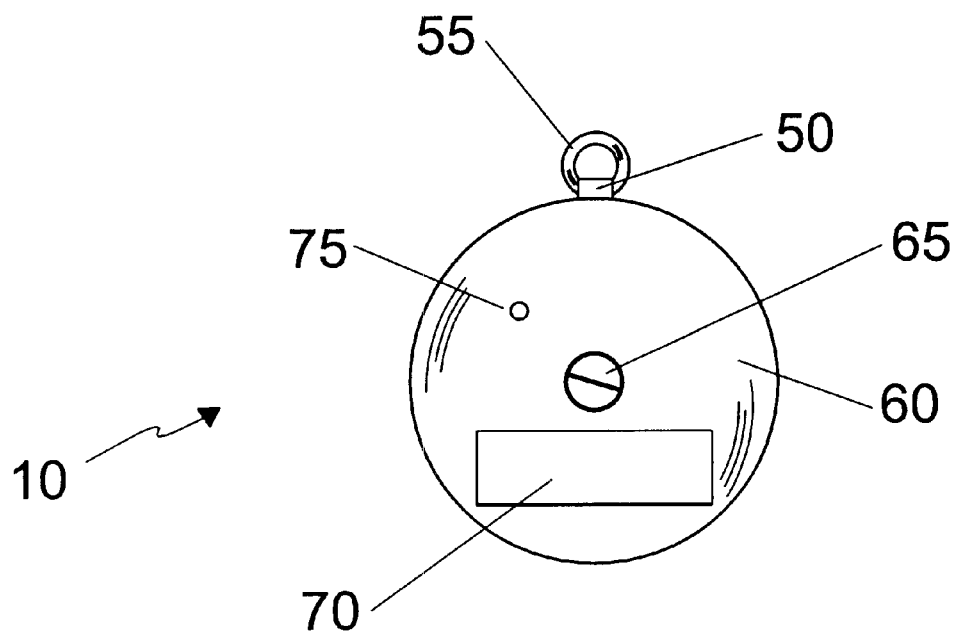
FIG. 3 a back view thereof.

FIG. 3 depicts the back view of the pet identification and retrieval device 10. A rear half enclosure 60 of identical size and similar nature to the front half enclosure 25 (as shown in FIG. 2) is provided with a centrally located first fastening means 65 such as a screw. The first fastening means 65 allows for the securing of the rear half enclosure 60 to the front half enclosure 25 (as seen in FIG. 2). The first fastening means 65 is removed to allow access to the interior of the pet identification and retrieval device 10 when the internal batteries, as described in greater detail below, are replaced. A permanent identification plate 70 is provided on the lower portion of the rear half enclosure 60 to allow for a permanent means of identification, should the audio replay of the pet identification and retrieval device 10 malfunction. The permanent identification plate 70 is envisioned to be of engraveable brass, though other materials and methods such as engraved plastic or photoengraving may also be utilized. Also located on the upper portion of the rear half enclosure 60 is a recessed recording switch 75. The recessed recording switch 75 is pressed by a pointed instrument such as a pen, when the owner or caretaker of the pet 15 (as seen in FIG. 1) wishes to record a new message. After the recessed recording switch 75 is pressed and released, the internal circuitry of the pet identification and retrieval device 10 will record a 30-second message. The recording process will be described in greater detail hereinbelow. The recessed recording switch 75 is easily accessible, though not easily activated without the use of a pointed instrument to allow the owner or care giver to quickly record a new message. This is envisioned as advantageous during such times as the pet 15 (not shown in this FIG.) is away from its permanent residence, such as at a park, where the owner or care giver may wish to record a cellular phone number or pager phone number. Other instances include travel, where the owner or care giver may wish to record a friend's phone number or hotel number. Such versatility ensures that the pet 15 (not shown in this FIG.) can quickly be returned to the owner or care giver under any circumstances in a quick and effective manner. The swivel link 50 and the connection ring 55, as described earlier in FIG. 2, are also visible in the rear view as depicted.

Figure 4:
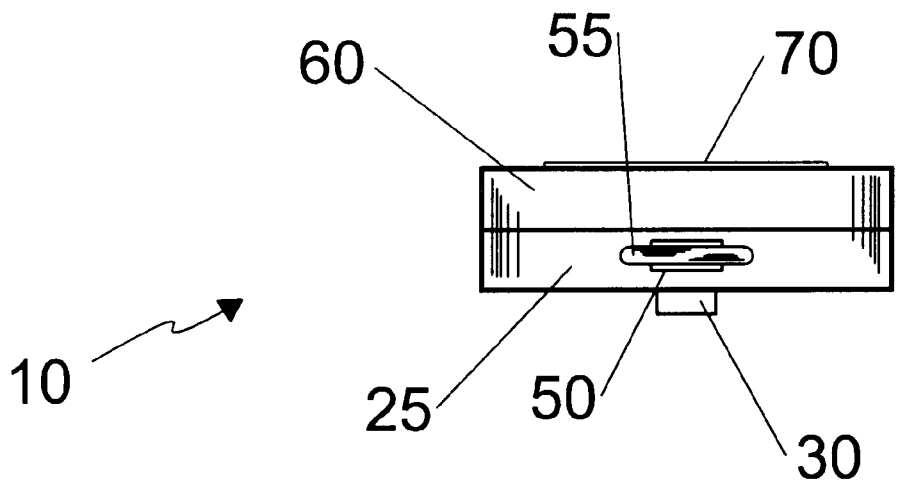
FIG. 4 top view thereof.

Referring now to FIG. 4, a top view of the pet identification and retrieval device 10 is shown. The play switch 30 is visible on the front half enclosure 25, on the front of the unit. The permanent identification plate 70 is visible on the rear half enclosure 60 on the rear of the unit. The swivel link 50 and the connection ring 55 is located solely on the front half enclosure 25 to allow for ease of removal of the rear half enclosure 60 for battery replacement operations as aforementioned described.

Figure 5:
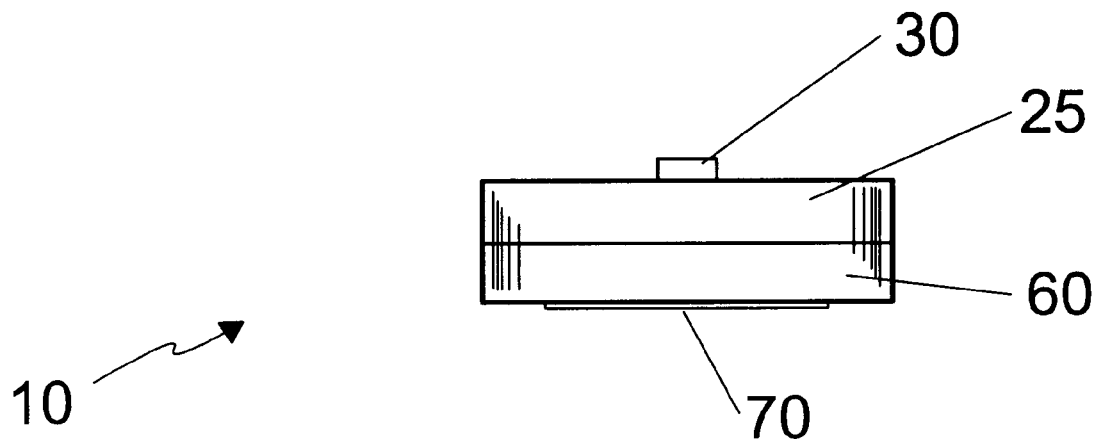
FIG. 5 is a bottom view thereof.

Referring now to FIG. 5, a rear view of the pet identification and retrieval device 10 is depicted. The play switch 30 is visible on the front half enclosure 25, on the front of the unit. The permanent identification plate 70 is visible on the rear half enclosure 60 on the rear of the unit.

Figure 6:
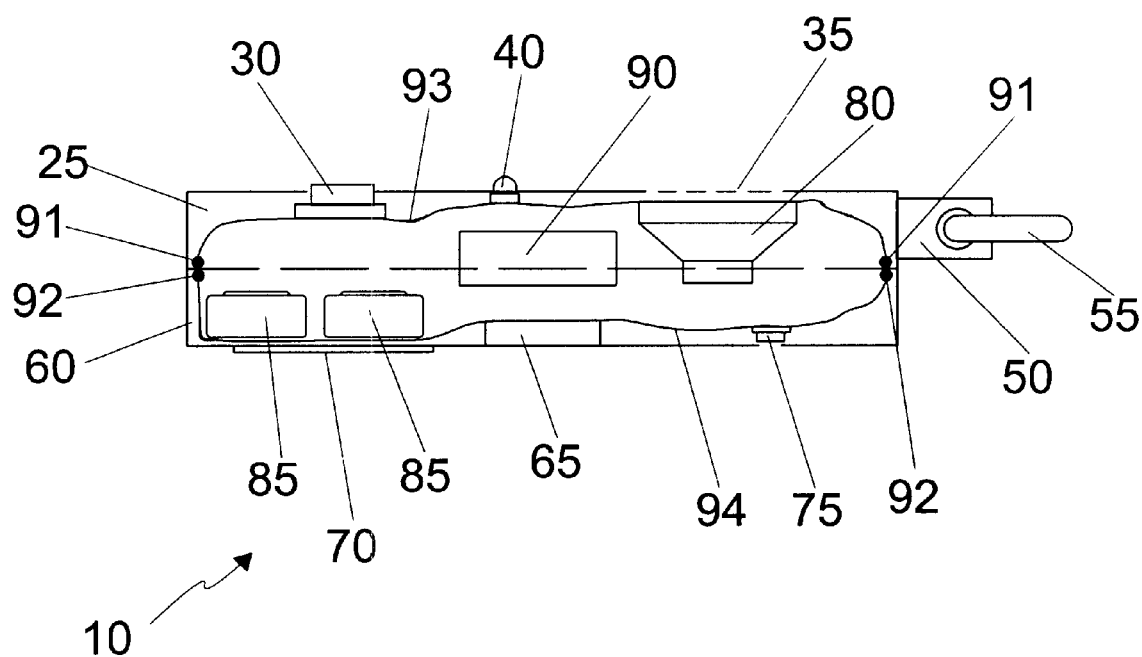
FIG. 6 is a sectional view of the pet identification and retrieval device as seen along a line VI—VI shown in FIG. 2.

Referring now to FIG. 6, a sectional view of the pet identification and retrieval device 10 as seen along a line VI—VI in FIG. 2 is shown. The front half enclosure 25 and the rear half enclosure 60 contain the internal components of the pet identification and retrieval device 10. The swivel action of the swivel link 50 and the connection ring 55 are more clearly depicted in this view. A mylar speaker 80 is located directly behind the speaker opening 35 to allow for the ease of sound passage. The mylar speaker 80 is envisioned to be of the Mylar film design to allow for small size required as well as for weatherproofing purposes, should the pet identification and retrieval device 10 become wet. Also located on the front half enclosure 25 is the play switch 30 and the low battery indicator 40. Located on the exterior portion of the rear half enclosure 60 is the first fastening means 65, the permanent identification plate 70, and the recessed recording switch 75. A pair of batteries 85 are located internal to the pet identification and retrieval device 10 as indicated. The batteries 85 are depicted as button cells, commonly found in watches, calculators and the like, but are not intended to be limiting. Also, located internal to the pet identification and retrieval device 10 is a VLSI digital recording and playback circuit 90. The VLSI digital recording and playback circuit 90 is of a conventional design commonly found in many products such as greeting cards, memo recorders, answering machines and the like. The VLSI digital recording and playback circuit 90 is of an encapsulated design to aid in weatherproofing duties. The internal functions of the VLSI digital recording and playback circuit 90 will be described in greater detail hereinbelow. All of the internal wiring has been omitted in this view for clarity, but will be described in greater detail herein below. While the design of the pet identification and retrieval device 10 is inherently weatherproof, all components are sealed by a front sealing gasket 91 and a rear sealing gasket 92. The front sealing gasket 91 and the rear sealing gasket 92 are circular in nature and are continuous around the perimeter of the pet identification and retrieval device 10. The front sealing gasket 91 and the rear sealing gasket 92 are physically bonded to a front sealing membrane 93 and a rear sealing membrane 94 respectively. The front sealing membrane 93 and the rear sealing membrane 94 form a waterproof barrier around all electrical components of the pet identification and retrieval device 10 any components such as the play switch 30, the low battery indicator 40, and the recessed recording switch 75 are provided with pass-thru leads in either the front sealing membrane 93 or the rear sealing membrane 94 to allow them to remain operational without affecting the integrity of the waterproof seal. The mylar speaker 80 is bonded to the front sealing membrane 93 thru the use of adhesives to allow the sound to pass thru without being impeded. The mylar speaker 80 is inherently and naturally waterproof and thus the waterproof integrity of the pet identification and retrieval device 10 is not violated. The front sealing gasket 91, the rear sealing gasket 92, the front sealing membrane 93 and the rear sealing membrane 94 all serve to provide a hermetic seal so as to prevent malfunction should the pet identification and retrieval device 10 be exposed to adverse environmental conditions.

Figure 7:
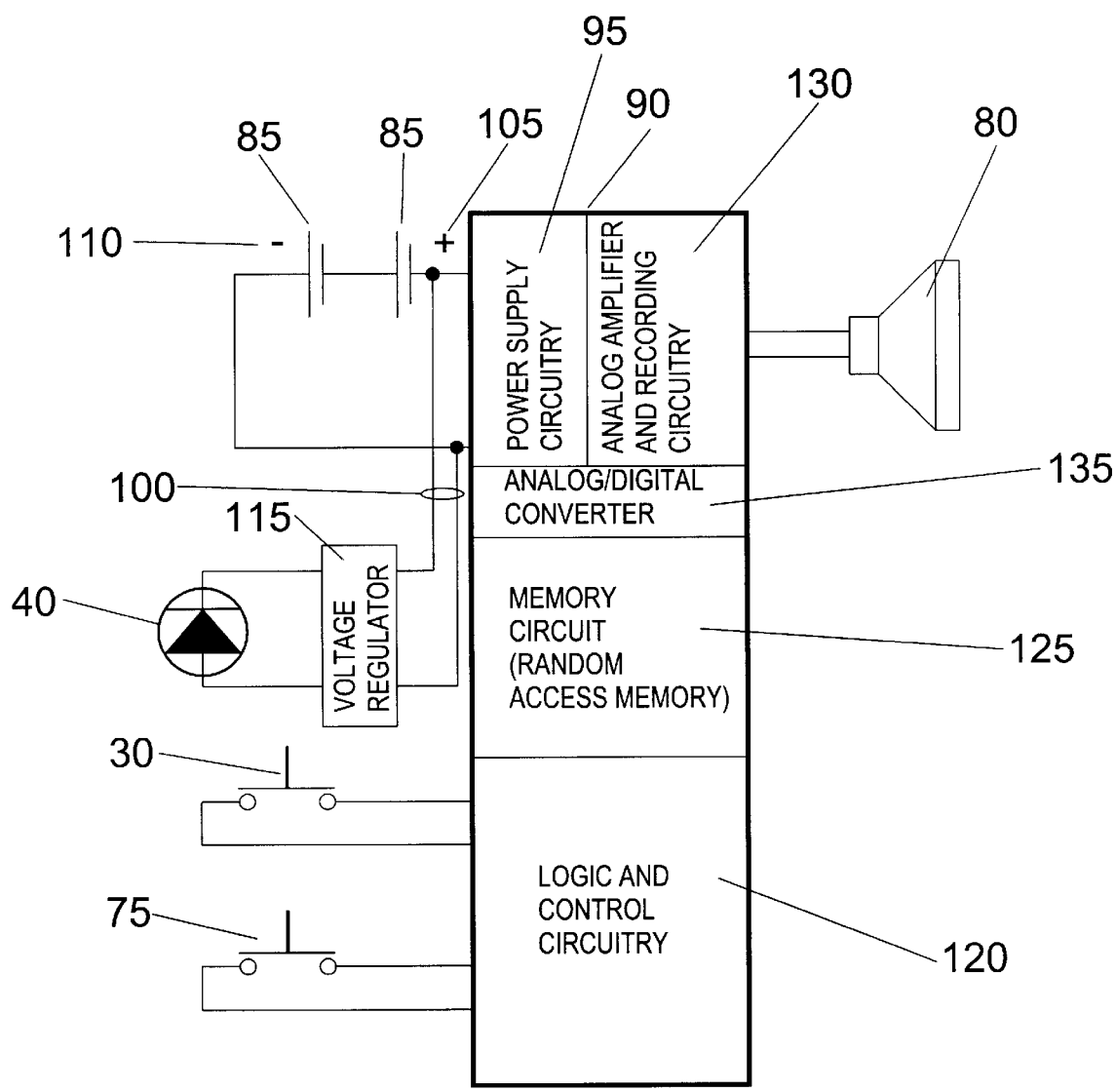
FIG. 7 is a functional electrical block diagram of the internal circuitry of the pet identification and retrieval device 10.

Referring now to FIG. 7, a functional electrical block diagram of the internal circuitry of the pet identification and retrieval device 10 is shown. The batteries 85 are connected in series to a power supply circuitry 95 section of the VLSI digital recording and playback circuit 90. A parallel connection 100 is made from a positive lead 105 and a negative lead 110 of the battery 85 circuit to a voltage regulator 115. Using an internal reference voltage of commonly known design, the voltage regulator 115 determines when the batteries 85 are beginning to fail. At that point the voltage regulator 115 begins to pulse a voltage signal on a systematic basis to the low battery indicator 40 to cause it to flash on and off. This resultant action will indicate to the owner or care giver that the replacement of the batteries 85 is necessary. Both the play switch 30 and the recessed recording switch 75 are connected to a logic and control circuitry 120 section of the VLSI digital recording and playback circuit 90. This circuitry allows for the playback of the previously recorded digital signal stored in a memory circuit 125 section of the VLSI digital recording and playback circuit 90 through an analog amplifier and recording circuit 130 section of the VLSI digital recording and playback circuit 90 and subsequently the mylar speaker 80 when the play switch 30 is activated. The logic and control circuitry 120 also allows for the recording, or loading, of an audio message, in a reverse manner to that aforementioned described, whenever the recessed recording switch 75 is activated. The logic and control circuitry 120 contains timer circuitry such that when either the play switch 30 or the recessed recording switch 75 is activated, a 30-second cycle begins . corresponding to the respective activation. No other activations from the play switch 30 or the recessed recording switch 75 are accepted until the 30-second cycle is complete. It is not necessary nor required that the play switch 30 or the recessed recording switch 75 remain pressed during the playback or recording cycle. An analog/digital converter 135 provides the necessary conversion between the memory circuit 125 and the analog amplifier and recording circuit 130, and operates in both directions. The analog amplifier and recording circuit 130 also contains the necessary circuitry to amplify, convert and condition the signal from the mylar speaker 80 to allow it to operate as a microphone during recording operations. While the pet identification and retrieval device 10 has been depicted with a mylar speaker 80 acting as a microphone, it should be noted that it is not intended to be limiting. A separate microphone could also be utilized in a similar manner.

Figure 8:
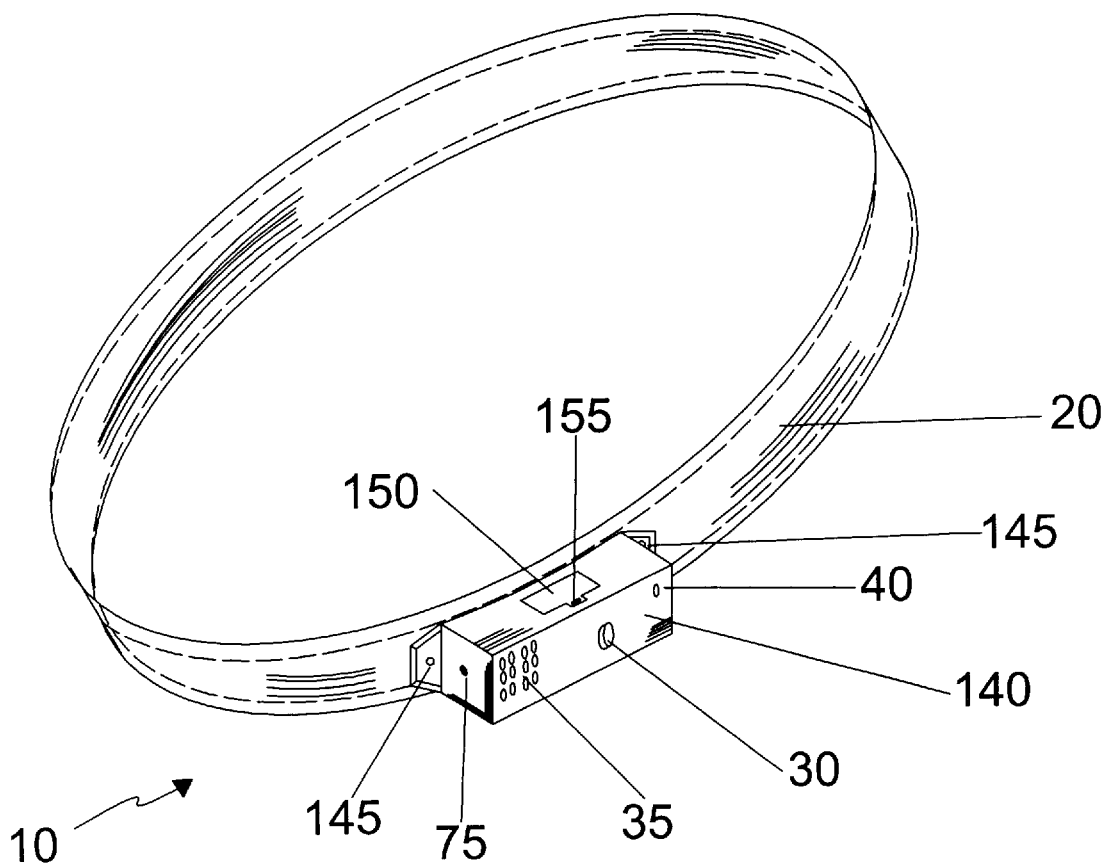
FIG. 8 is a front perspective view of an alternate embodiment of the present invention.

Referring finally to FIG. 8, a front perspective view of an alternate embodiment of the present invention where the pet identification and retrieval device 10 is attached to the collar 20 in a permanent manner is depicted. An alternate enclosure 140 is attached to the collar 20 by two second fastening means 145, such as rivets. This attachment action does not allow the alternate enclosure 140 to move as is the case with the swivel link 50 (as aforementioned described in FIG. 2). This results in a streamlined design that does not permit the alternate enclosure 140 to swing, nor impair the animal's movements, or increase the risk of the alternate enclosure 140 getting caught on something. All components, with their preferred functionality, including the speaker opening 35, the play switch 30, the recessed recording switch 75, and the low battery indicator 40 are present. An access door 150 secured by a third fastening means 155 is provided to allow access and replacement of the batteries 85 (not shown in this FIG.).

2. Operation of the Preferred Embodiment

To use the present invention, the owner simply removes the pet identification and retrieval device 10 from the box. The owner then inserts a small, pointed object, such as a ballpoint pen, into the recessed recording switch 75 located on the rear half enclosure 60. The device is then held approximately eight to twelve inches away from the operator's mouth, and the owner speaks the information desired to be recorded, such as the pet's 15 name and the owner's name, address and phone number. The operator will have approximately 30 seconds to record a message. The operator will then press the play switch 30 to ensure that the correct information is played back.

The connection ring 55 is then connected to the collar. When an individual finds the lost pet 15, the individual simply presses the play switch 30 to hear the relevant information, enabling the individual to contact the pet's 15 owner. If the owners move or go on vacation with the pet 15, a new message is recorded as described above.

Periodically, the operator will check the low battery indicator 40, which will indicate when the battery 85 is low. To change batteries 85, the first fastening means 65 is removed, the front half enclosure 25 and rear half enclosure 60 are separated, and a new battery 85 is placed inside. The front half enclosure 25 and rear half enclosure 60 are then placed back together and the first fastening means 65 is then closed.

The foregoing description is included to illustrate the operation of the preferred embodiment and is not meant to limit the scope of the invention. The scope of the invention is to be limited only by the following claims.

What is claimed is:

1. A pet identification and retrieval device comprising:
   a front half enclosure,
   a rear half enclosure, said rear half enclosure connecting to and mating with said front half enclosure in a manner such as to provide an enclosed internal housing volume;
   a speaker opening formed within said front half enclosure;
   a mylar speaker located directly behind the speaker opening to allow for the ease of sound passage.
   a permanent identification plate affixed to an exterior portion of the rear half enclosure
   a front sealing gasket and a rear sealing gasket, said front sealing gasket and said rear sealing gasket being circular in nature and attached continuously around the perimeter of the pet identification and retrieval device, both said front sealing gasket and said rear sealing gasket being physically bonded to a front sealing membrane and a rear sealing membrane respectively, said front sealing membrane and said rear sealing membrane thereby forming a waterproof barrier to the internal housing volume; and
   recording and playback means for selectively recording or playing back a customizable, audible message.

2. The pet identification and retrieval device described in claim 1, further comprising a recessed recording switch for controlling said recording and playback means, said recessed recording switch located on said rear half enclosure, and said recessed recording switch is activated by pressing down on it with a sharp instrument.

3. The pet identification and retrieval device described in claim 1, further comprising a low battery indicator in communication with said recording and playback means, said low battery indicator located on said front half enclosure, in plain view of the pet owner.

4. The pet identification and retrieval device described in claim 3, wherein said low battery indicator comprises a light emitting diode which would flash on a periodic basis.

5. The pet identification and retrieval device described in claim 1, further comprising a first fastening means for connecting said front half enclosure to said rear half enclosure, said fastening means consists of a easy to remove screw which holds said front half enclosure and said rear half enclosure together.

6. The pet identification and retrieval device described in claim 1, wherein said recording and playback means comprises a VLSI digital recording and playback circuit capable of recording and reproducing a message of at least 30 seconds in duration.

* * * * *